(12) United States Patent
Graunke

(10) Patent No.: US 8,875,112 B2
(45) Date of Patent: Oct. 28, 2014

(54) IMPLEMENTING PORTABLE CONTENT PROTECTION TO SECURE SECRETS

(75) Inventor: Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 13/426,708

(22) Filed: Mar. 22, 2012

(65) Prior Publication Data

US 2012/0180032 A1 Jul. 12, 2012

Related U.S. Application Data

(62) Division of application No. 12/507,863, filed on Jul. 23, 2009, now Pat. No. 8,166,471, which is a division of application No. 10/355,967, filed on Jan. 31, 2003, now Pat. No. 7,584,354.

(51) Int. Cl.
*G06F 9/45* (2006.01)
*G06F 21/12* (2013.01)
*G06F 21/14* (2013.01)

(52) U.S. Cl.
CPC .............. *G06F 21/125* (2013.01); *G06F 21/14* (2013.01)
USPC ........................................... 717/144; 713/193

(58) Field of Classification Search
USPC ................... 717/170, 144; 713/193
See application file for complete search history.

(56) References Cited

U.S. PATENT DOCUMENTS

| | | | |
|---|---|---|---|
| 5,790,859 A * | 8/1998 | Sarkar | 717/130 |
| 6,041,122 A | 3/2000 | Graunke et al. | |
| 6,205,550 B1 | 3/2001 | Nardone et al. | |
| 6,256,577 B1 | 7/2001 | Graunke | |
| 6,286,135 B1 * | 9/2001 | Santhanam | 717/146 |
| 6,427,234 B1 * | 7/2002 | Chambers et al. | 717/140 |
| 6,832,369 B1 * | 12/2004 | Kryka et al. | 717/140 |
| 7,430,670 B1 * | 9/2008 | Horning et al. | 713/190 |
| 7,584,354 B2 | 9/2009 | Graunke | |
| 2003/0018608 A1 * | 1/2003 | Rice et al. | 707/1 |
| 2010/0077228 A1 | 3/2010 | Graunke | |

FOREIGN PATENT DOCUMENTS

CN ZL03132868.0 12/2006

OTHER PUBLICATIONS

Gaissarian, S., "Preliminary Report on Optimizing Compilers and Code Transformations," Jun. 2000, pp. 1-38.
Jacobson, C., "Planning Content Protection for PC DTV", Nov. 2001, pp. 1-6.
Intel Corporation, "Intel Renewable Authentication Agent System 1.2", Apr. 1999, pp. 1-47.

* cited by examiner

*Primary Examiner* — Christopher Brown
(74) *Attorney, Agent, or Firm* — Trop, Pruner & Hu, P.C.

(57) ABSTRACT

A source-level compiler may randomly select compilation conventions to implement portable content protection, securing the secrets embedded in a program by shuffling associated data. The program may be developed using a source language that is applicative on the associated data. To obscure the embedded secrets, in one embodiment, pre-compiler software may be deployed for compiling the program in a random-execution-order based on a random seed indication that randomly selects compilation conventions and a shuffling algorithm that moves the associated data across the program during execution.

3 Claims, 6 Drawing Sheets

IMPLEMENTING PORTABLE CONTENT PROTECTION TO SECURE SECRETS

CROSS-REFERENCE TO RELATED APPLICATIONS

This application is a divisional of U.S. patent application Ser. No. 12/507,863, filed on Jul. 23, 2009 now U.S. Pat. No. 8,166,471, which is a divisional of U.S. patent application Ser. No. 10/355,967, filed on Jan. 31, 2003, which issued as U.S. Pat. No. 7,584,354.

BACKGROUND

The invention relates generally to content protection, and more particularly to implementing portable content protection for securing embedded secrets in software.

Many commercial entities offer sensitive software-based content to different users. One scenario for dissemination of protected content involves electronically distributing content including software, books, music, and video over a network to systems and/or devices. However, the distributed content, such as software programs may be prone to different kinds of attacks such as a direct attack by an otherwise legitimate end user and an indirect attack by a remote hacker or an automated attack. For example, many software tools may be deployed to carry out different types of automated attacks to extract secrets from the protected content. Against reverse engineering and other attacks set forth above, organizations may have to defend software integrity of the code, enabling safe deployment in hostile environments. Protection of copyright and corporate information, however, remains a challenge as unprotected data or code may be easily copied and broadcast to hundreds of millions of Internet users, for instance. In addition, emergence of open platforms for content playback makes content even more vulnerable to hostile attacks.

To this end, some form of protection may be applied to content, e.g., to the content owned by a particular party that has paid for the right to use the content and has agreed to abide by the usage terms. In this manner, content protection may allow an authorized viewer full access to the content but inhibit a pirate user from making illicit copies or extracting embedded secrets. Content protection may involve producing tamper-resistant software, designed to make it difficult to observe the execution of the code. For securing content, such protection may be applied in conjunction with cryptography, which is complementary to tamper-resistant software. Although cryptography works well in an environment, where both the sender and receiver of the transmission are trusted parties, attacks on software deployed in hostile environments from malicious software and ill-intended users are unavoidable. Therefore, conventional software implementations of cryptographic algorithms may not be sufficient, particularly against many sophisticated attacks involving a hostile user or automated attack tool that may access and control the execution environment. With the emergence of software automated attack tools, statically hiding secrets from disclosure in the code may no longer be adequate either.

In particular, protecting embedded secrets, such as proprietary algorithms and cryptographic keys through both space (in the code) and time (frequent renewal) may involve making it difficult to modify the intended behavior of a piece of software. When this need is combined with the need to distribute software in architectural neutral formats that contain much of the same information as the original source code, however, the distributable compiled software become relatively easy to decompile, revealing the secrets to malicious reverse engineering attacks, as an example. Moreover, devising tamper-resistant software which may fail in an unobvious manner without creating any information that is useful to an attacker may be difficult because making software robust to changes while maintaining fragility to any undesired changes from the attacker in that software are two opposing requirements.

Thus, there is a continuing need for better ways to implement portable content protection, especially protecting secrets embedded in software.

DETAILED DESCRIPTION

Figure 1:
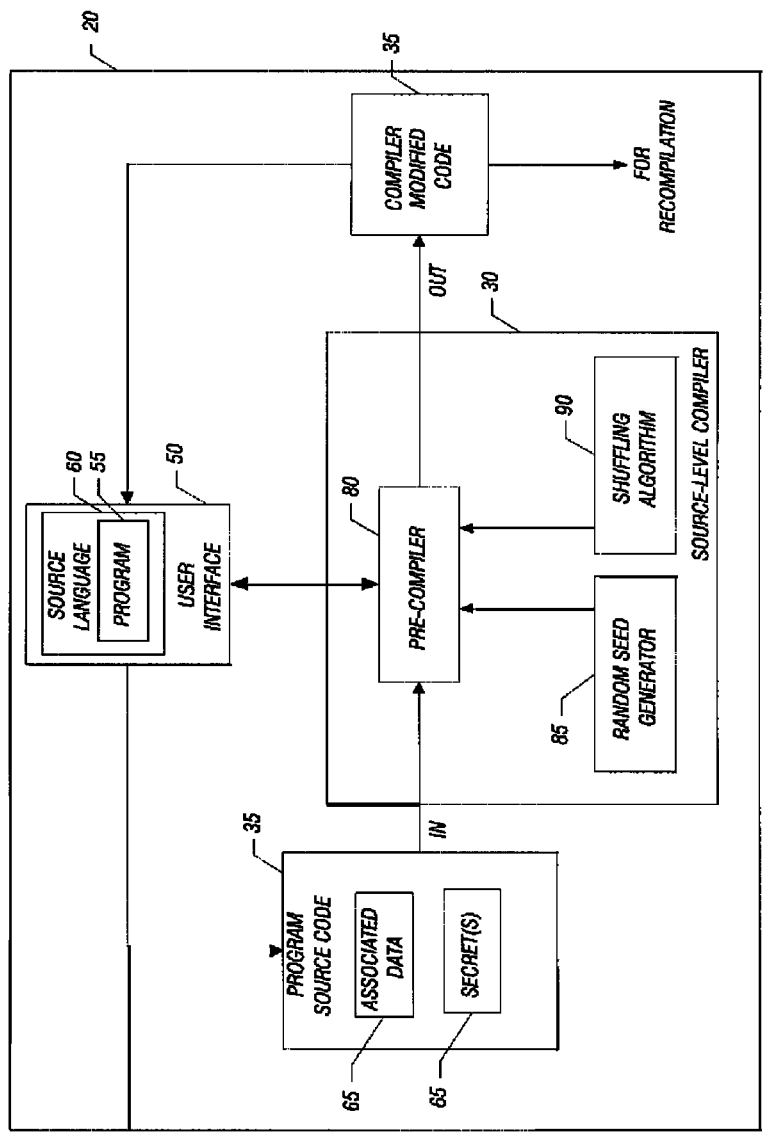
FIG. 1 is a schematic depiction of a program compiler module consistent with some embodiments of the present invention.

A program compiler module 20, as shown in FIG. 1, includes a source-level compiler 30 that receives program source code 35 for producing compiler-modified code 45, implementing portable content protection to secure embedded secrets in accordance with one embodiment of the present invention. The program compiler module 20 may comprise a user interface 50 to develop a program 55 based on a source language 60, in some embodiments of the present invention. An example of the user interface 50 may be a language editor capable of providing a programming environment that uses language semantics for different dialects.

In program development, the program source code 35 that corresponds to program 55 may include associated data 65 and one or more embedded secrets 75. The source language 60 may be applicative on the associated data 65 in the program 55. For the source language 60 to be applicative on the associated data 65, the source language 60 may operate on variables, such as data variables referenced within the program 55. However, the data variables may be initialized and/or changed based on a particular source language employed to develop the program 55.

While the program 55 may include statements or instructions based on language semantics and dialect, data including variables may be associated with the program 55 as the associated data 65 in some examples. Before distribution, the program 55 may be compiled by the program compiler module 20 in a random-execution-order, substantially obscuring the embedded secrets 75 from unintended disclosure. Using the source-level compiler 30, compiler module 20 may hide these secrets 75, such as proprietary information and programming techniques embedded within the program source code 35 at the source level in some cases.

Consistent with some embodiments of the present invention, the source-level compiler 30 may comprise pre-compiler software 80 which may be seeded with a random number using a generator 85 that may provide a pseudo, random seed number, as one example. In order to compile the program in a random-execution-order while obscuring the embedded secrets 75, the pre-compiler software 80 may utilize a shuffling algorithm 90. While the generator 85 may provide a seed indication to randomly select one or more compilation conventions from a different compilation of the program 55, the shuffling algorithm 90 may enable moving of the associated data 65 across the program 55 during execution for the pre-compiler software 80.

The shuffling algorithm 90 may enable desired embedding of the secrets 75 in the program source code 35 when the pre-compiler software 80 transforms the program 55 in a tamper-resistant manner into the compiler-modified code 45 that may be platform-independent according to some embodiments of the present invention. In this manner, essentially the source-level compiler 30 may implement portable content protection to secure the embedded secrets 75 from disclosure upon recompilation of the compiler-modified code 45 into object or compiled code on a platform-specific compiler, optimizing code obfuscation. That is, the source-level compiler 30 may compile the program 55 so that the program source code 35 may not be usefully modified in a meaningful way, portably protecting the properly embedded secrets 75 from unintended disclosure, such as that of proprietary algorithms and cryptographic keys present in the compiler-modified code 45 for some embodiments of the present invention.

Even though the logic to implement the portable content protection that secures the embedded secrets 75 is incorporated within the pre-compiler software 80 which transforms a program written in an applicative programming source language, other embodiments may be implemented using different classes of programs and tools that analyze and control the flow of code and/or data, such as software analysis, de-bugging testing tools. Yet different embodiments of the present invention may be implemented in another form of software development tools.

Regardless, consistent with some embodiments of the present invention the type of high-level computer programming languages used to write or develop the source-level compiler 30 may include both object-oriented languages and procedural languages. For instance, to implement the source-level compiler 30, high-level programming languages including C and C++ may be employed, as two examples. Although some embodiments of the source-level compiler 30 may be particularly suitable for programs developed in source languages C and/or C++, any common source language which may be applicative on the associated data 65 provided for the program 55 may be advantageously used to obtain the program source code 35 in certain embodiments of the present invention.

Other examples of the source languages that may be used in many examples of the present invention, include a parallel programming language capable of distributing multi-media content over the World Wide Web (WWW) or and other communication mediums. As an example, the program 55 may be developed using the parallel programming language specifications directed to Internet-based software content distribution. These specifications may be used to create the program source code 35, including graphics, sounds, text or other media content. The program 55 may then be distributed so that users may access the program 55 via a particular Web site available on the Internet according to one embodiment of the present invention.

Figure 2:
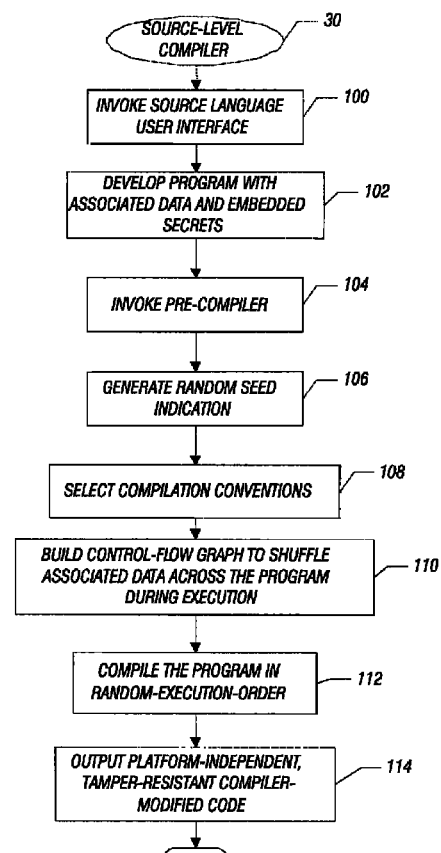
FIG. 2 is a flow chart for compilation of a program in a random-execution-order by the source-level compiler shown in FIG. 1 to obscure secrets according to one embodiment of the present invention.

Referring to FIG. 2, the source-level compiler 30 shown in FIG. 1 may implement portable content protection that secures the embedded secrets 75 in the program source code 35, providing platform-independent, tamper-resistant compiler-modified code 45 in accordance with many embodiments of the present invention. The source-level compiler 30 may accept, for example, the program source code 35 based on a structured, analyzable, high-level source language that may produce portable low-level, monolithic code (spaghetti code), i.e., the compiler-modified code 45 that may further be recompiled on any one of suitable platform-specific compilers depending upon a specific application in some scenarios.

At block 100, the user interface 50 may be invoked for developing the program 55 from the source language 60, in certain embodiments. Using the source language 60, the source-level compiler 30 may identify one or more memory allocations and parallel stream objects of the program 55. Based on one or more memory allocations and parallel stream objects based on the specifications laid out for a parallel programming source language being applicative on the associated data 65, the random-execution-order of the program 55 may be provisioned in some situations.

According to one particular example of an embodiment of the present invention, an applicative source language, while using a single-assignment semantics dialect, may be used to obtain the program source code 35. While programming in a high-level source language, such as C, memory leaks and when programming in the parallel programming source language, garbage-collection interruptions may cause sometimes performance of the source-level compiler 30 to deteriorate. However, garbage-collection may be a significant characteristic while rendering video and audio in real time applications. To this end, use of an applicative language as the source language 60 in some embodiments of the present invention may cause the source-level compiler 30 to be analyzed and optimized for both performance and obscurity of the secrets 75 embedded within the program source code 35.

For the purposes of permitting garbage-collection, reference counting may be introduced for heap-allocated objects associated with the garbage collection, assisting with real-time memory recycling for the single-assignment semantics dialect in certain situations. In this manner, the single-assignment semantics dialect of the applicative source language 60 may be preserved upon recompilation by executing the program 55 in the random-execution-order, providing robust copy protection for content providers. In other words, having the associated data 65 moved or shuffled in the program source code 35 as the program 55 executes, tamper resistance may be incorporated in addition to platform-independent, producing compiler-modified code 45 for that program 55. As a result, combined use of an applicative source language and random-execution-order by the source-level compiler 30 may optimize obscurity of the embedded secrets 75 desirably hidden in the program source code 35 in accordance with few examples of the present invention.

At block 102, the program 55 along with the associated data 65 and embedded secrets 75 may be desirably developed. To compile the program 55 in a random-execution-order for obscuring the embedded secrets 75, the pre-compiler software 80 may be invoked at block 104, which, in turn, may generate a random seed indication or number at block 106 and a selection of appropriate compilation conventions at block 108. By replacing standard conventions with randomly-chosen alternatives at the block 108 based on the random seed indication selected at block 106, the pre-compiler software 80 may execute the program 55 in the random-execution-order. For example, the random seed indication may alter code scheduling, variable layout, function-calling conventions and other conventions so that these choices are random and different for each compilation of the same program source code 35. However, ideally the recompilation of the compiler-modified code 45 may be permitted with additional de-bug information only if the random seed indication is made available.

In some embodiments of the present invention, to shuffle associated data 65 across the program 55 during execution, a control flow graph may be built in a conventional manner at block 110. The control flow graph may indicate one or more data and code paths within the program source code 35. Using a control flow analysis, the flow of control for the program source code 35 may be analyzed according to certain embodiments of the present invention. For some embodiments, one or more data variables may be identified in the associated data 65. During the control flow analysis, the data variables may be randomly allocated as array elements. To shuffle data along a data path for a particular data variable, code may be inserted in the program source code 35 based on a heuristic that ensures that when multiple code paths converge in the control flow graph, at least two such paths produce the same permutation of the data, while each path arrives at that permutation by a random-unique order of data exchanges. In one case, permutation of the data entails scrambling of the data to cause a desired encryption.

To shuffle the associated data 65 across the program 50, the source-level compiler 30 shown in FIG. 1 may track data address breakpoints in some embodiments. After the schedule has been determined for execution of the program 50, the source-level compiler 30 may compact the amount of storage to inject entropy by assigning the same storage cell to different data values that may not be needed at the same time.

After this compaction, the program source code 35 may be generated, shuffling the storage assignments uniquely and randomly along each path in the program 50, ensuring to arrive at the same permutation when two paths converge. Thus, the offset of each data variable in the array may change as the program source code 35 executes. However, in many embodiments, the amount of shuffling may be heuristically bounded by the amount of code in the program 55, without significantly increasing the execution time.

To arrive at the same permutation where multiple code paths converge, in some embodiments for permutations, an exchange of two elements of an ordered set may be done, for example in constant time. In this scenario, the cost function is therefore the number of exchanges. First, the number of exchanges (of two distinct elements) necessary to go from one permutation to another may be examined. This number is referred to as the distance between the two permutations. Since exchanges are their own inverses, one example of an exchange may be $d(p1,p2)=d(p2,p1)$ for which the triangle inequality holds: $d(p1,p3)<=d(p1,p2)+d(p2,p3)$.

For the purposes of computing the distance between two permutations, one permutation may be used as the base, to define the "home" positions. Upon examining the other permutation, an element may be determined such that the element is in the same position as in the base permutation, forming a singleton subset. However, no exchanges may be necessary to return it to its home position.

If, on the other hand, an element is not in its home position, another element that is may be determined. By continuing this process, eventually coming back to the first element, a subset may be generated whose elements are not in the home positions. This subset may be referred to as a derangement subset. Regardless of the order in which the exchanges are done, it may take exactly N−1 exchanges to rearrange the elements so that they are in their home positions.

Combining these two cases, the distance may be computed between the two permutations, having N subsets each of size $M_i$ as the sum of $(M_i-1)$ over all i from 1 to N irrespective of whether a subset is a derangement or singleton. However, when all elements belong to a single derangement subset, the maximum distance between two permutations of S elements is S−1. For example, two elements of a given (source) permutation may be exchanged to produce a new permutation that is closer to a second given (target) permutation. Conversely, the distance of the new permutation from the given target permutation may be increased. In this manner, using the target permutation to define the home positions, all the singleton and derangement subsets of the source permutation may be determined in one case.

Depending upon the control flow graph, the program 55 may be compiled in a random-execution-order at block 112 while shuffling the data as the program 55 runs based on the shuffle algorithm 90 (FIG. 1). Instead of using data breakpoints, by having the data move as the program 55 executes, position-independent code may not ideally be used for some embodiments of the present invention. Moreover, self-modifying code may not necessarily be employed, enabling the use of the source-level compiler 30 within a read only memory (ROM) in some cases. Because the source-level compiler 30 is essentially independent of a particular instruction set, it may be appropriately used across platforms.

At block 114, the program source code 35 may be transformed in a tamper-resistant manner into the compiler-modified code 45 that is platform-independent in accordance with one embodiment of the present invention. Use of the control flow graph derived from the program source code 35, in some examples of the present invention may protect the embedded secrets 75 from disclosure upon recompilation of the compiler-modified code 45 into object or compiled code on a platform-specific compiler, optimizing code obfuscation. Availability of the random seed indication and appropriate de-bug information, may permit the recompilation of the program 55 in some situations. That is, first the determination as to the availability of an appropriate random seed indication may be made before proceeding with the recompilation, producing the object or compiled code in which portable content protection is implemented to secure the embedded secrets 75 associated with the program 55.

Figure 3:
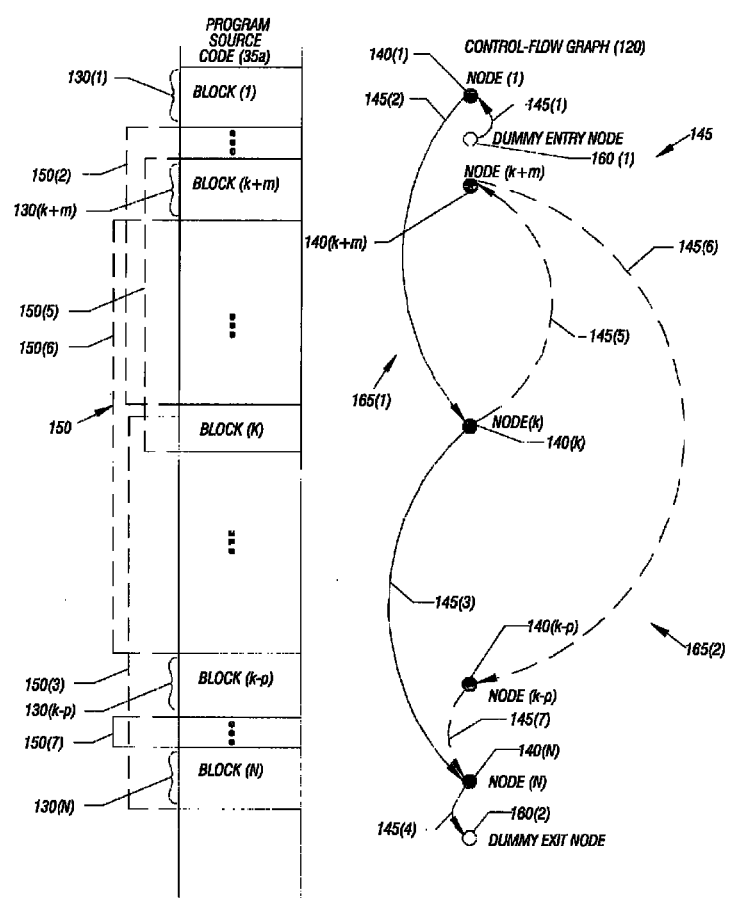
FIG. 3 shows a code map of program source code from which blocks from code may be used to build a control flow graph in the pre-compiler software shown in FIG. 1 according to one embodiment of the present invention.

To obtain a control flow graph 120 shown in FIG. 3 from a code map of a partitioned program source code 35a so that transformations for disguising program control flow in the compiler-generated code 45 may be performed to defend against tampering attacks, consistent with some embodiments of the present invention. For example, code transformation may provide tamper resistance to defend against reverse engineering attacks and/or protect against automated attacks while allowing the building and deployment of applications in a local environment and an open computing platform of choice. The source-level compiler 30 may apply tamper resistance to the program source code 35a, protecting it from a variety of attacks intended to alter or bypass functionality, or obtaining the embedded secrets 75 which may include sensitive data or media content.

Responsive to a control transformation, at some point, the control flow graph 120 may be obtained from the program source code 35a, identifying a set of blocks of source code 130(1), 130(k+m), 130(k), 130(k–p), and 130(N) in a particular example. In order to build the control flow graph 120 based on the program source code 35a, a node 140 corresponding to an associated block 130 along with arcs 145, corresponding to jumps 150 present in the program source code 35a may be identified. For example, while the node 140(1) may correspond to block 130(1), the arc 145(2) may correspond to the jump 150(2). Dummy entry and exit nodes may be added to the control flow graph 120, according to some embodiments of the present invention, introducing the redundant and auxiliary computations to significantly improve fragility while increasing diffusion of side effects when changes may be made to the program source code 35a, in response to any modifications introduced in the compiler-modified code 45, as a result of hostile attacks.

In one embodiment, exactly one dummy exit node and one dummy entry node may be used for the heuristic or algorithm to assign permutations of nodes in the control flow graph 120. By taking all the entry nodes and appending into one entry node, a single dummy entry node may be formed that may indicate all of the possible incoming entries in the control flow graph 120. Likewise, one dummy exit node may be formed by taking all the exit nodes and artificially adding arcs to a new dummy exit node so that the control flow graph 120 includes a single dummy exit node. Accordingly, in the control flow graph 120 that may have multiple entries and multiple exits, such as a valid flow graph, in programming languages, a single entry—a single exit flow graph may be obtained by combining these two dummy nodes in some embodiments.

In this manner, the control flow graph 120 in which every node is unassigned to begin with, a permutation may be assigned to the single dummy entry node, and then a shortest path to the single dummy exit node, assigning all the permutations along that path. Thereafter, shorter paths between all the nodes which are now assigned on that path may be determined, suggesting any other short paths or short walks through the control flow graph 120 that should be assigned first before the longer ones. This process may be repeated until every node in the control flow graph 120 is assigned.

A dummy entry node 160(1) and a dummy exit node 160(2) may be utilized to insert code in the program source code 35a, shuffling data along the data path for the particular data variable. For example, a data path may indicate where a data variable is initialized and subsequently changed within the program source code 35a or within a particular block 130 thereof. Likewise, a code path may indicate a particular jump 150 being represented as an arc 145 in the control flow graph 120. By producing the same permutation of the data when more than one code path in the control flow graph 120 converge to arrive at that permutation by a random-unique order of data exchanges, a desired content protection may be implemented to secure the embedded secrets 75 in the program 55, producing portable code in the form of the compiler-modified code 45 for subsequent recompilation with a platform-specific commercial compiler.

In some embodiments, prevention of hostile attacks from unauthorized sources may result in a significant improvement for robustness rules utilized in content protection, for example in content protection licenses issued for various industry specifications. Robustness rules usually indicate any design requirements intended to inhibit a hacker from either altering or bypassing content protection. As a result, content providers may advantageously offer enhanced copy protection of their content.

Using the control flow graph 120, in many embodiments of the present invention, a shortest walk (including paths and cycles) connecting two nodes (hereafter referred to as simply "shortest connecting walk," e.g., between a first and a last node) marked as assigned may be determined, providing a desired control flow transformation that adequately disguises program control flow, defending against various tampering attacks. However, the unassigned nodes 140 may get assigned permutations and the arcs 145 get assigned exchanges. For example, a first and a second node may be assigned a permutation each of a data variable, such as variable locations. By minimizing the number of exchanges when building a transition from the first state or permutation of the first node to the last permutation of the last node, a shortest walk connecting the two nodes may be determined, in some embodiments. In one ease, by assigning the shortest ones based on a heuristic, extra exchanges may be avoided.

Specifically, a first and a second shortest connecting walks 165(1) and 165(2) may be derived for the dummy entry node 160(1) and the dummy exit node 160(2), optimizing code obfuscation or the control flow transformation while meeting desired security and performance requirements without introducing any system or platform dependencies. The first shortest connecting walk 165(1) may include the arcs 145(1) through 145(4) connecting the dummy entry node 160(1) to the dummy exit node 160(2). Likewise, the second shortest connecting walk 165(2) may include the arcs 145(5) through 145(7), connecting the nodes 140(k). 140(k+m), and 140(k–p). As an example, the shortest connecting walk 165(1) between the two dummy nodes, i.e., the dummy entry node 160(1) and the dummy exit node 160(2), in the control flow graph 120 may suggest a path through the remaining unassigned intermediate nodes 140(1) through 140(N).

For the two nodes on the end of the shortest connecting walk 165(1) that are unassigned nodes 140(1) through 140 (N), the beginning end permutation may be changed to the end permutation by doing the exchanges along the way with the minimal number of exchanges that are still random. The nodes 140(k) and 140(N) that get assigned serve as the end points for the shortest connecting walk 165(2). This process may be repeated until every node 140(1) through 140(N) is assigned, for example to connect the assigned nodes 140(k) and 140(N) with some exchanges and some intermediate permutations at the intermediate nodes 140 (k+m) and 140 (k–p) that are still unassigned.

Figure 4:
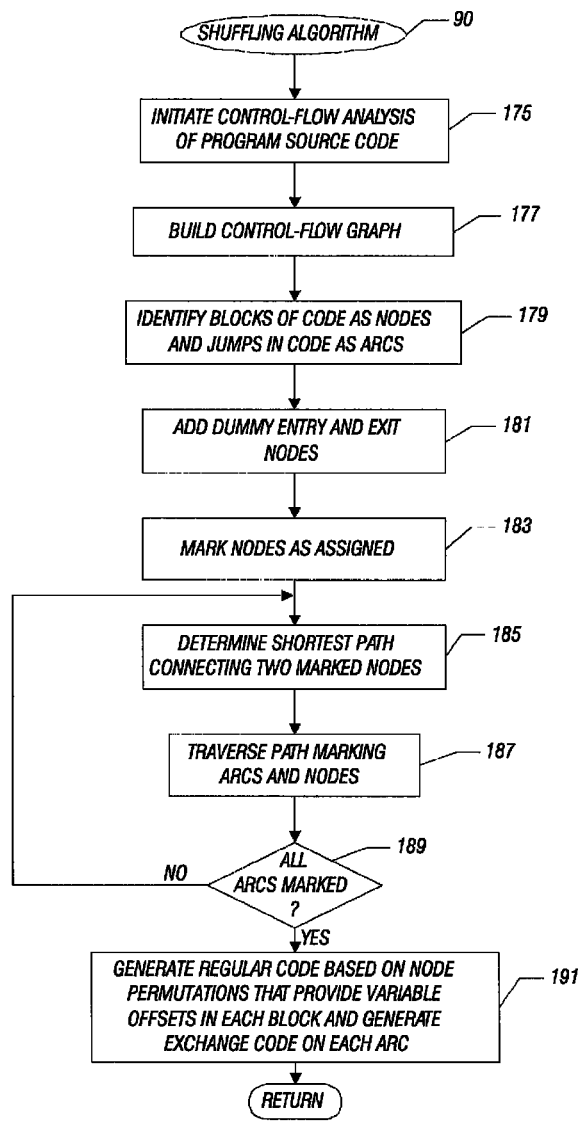
FIG. 4 is a flow chart showing a shuffling algorithm that moves associated data across the program during execution for the pre-compiler software shown in FIG. 1 according to one embodiment of the present invention.

Turning now to FIG. 4, consistent with certain embodiments of the present invention, the source-level compiler 30 (FIG. 1) may use the shuffling algorithm 90 for moving data across the program 55, enabling the pre-compiler software 80 to execute the program source code 35 in a random-execution-order such that the embedded secrets 75 may be appropriately obscured in an optimized manner. At block 175, a control flow analysis of the program source code 35a as shown in FIG. 3 may be initiated. Using the program source code 35a, the control flow graph 120 as depicted in FIG. 3 may be obtained at block 177, by way of one example.

As indicated above, the blocks 130 of the program source code 35a may be identified as nodes 140 while the jumps 150 in the code 35a may be indicated as the arcs 145 of the control flow graph 120 at block 179. Depending upon a particular application responsible for implementing portable content protection of desirable embedded secrets 75, exactly one dummy entry node 160(1) may be created, whose successors are the entry nodes (nodes with no predecessor) in the flow graph. Similarly, exactly one dummy exit node 160(2) may be created whose predecessors are the exit nodes (nodes with no successor). These two dummy nodes and arcs may be added to the control flow graph 120 at block 181. At block 183, while the dummy exit node 160(2) may be marked as assigned, allocating an array of data variables of different sizes, the dummy entry node 160 may be assigned a random permutation for variable offsets. A permutation in accordance with some embodiments of the present invention refers to scrambling of data for shuffling purposes in those implementations that may involve some form of data variables.

The shortest walk connecting already assigned nodes 160(1) and 160(2) via unassigned nodes 140(1) through 140(N) and arcs via these yet unassigned nodes may be determined at block 185. The first and last nodes in the shortest connecting walk 165(1) are normally marked as assigned (meaning that a permutation is already assigned to these nodes (except in the case of dummy exit node 160(2))). At this point none of the intermediate nodes in the shortest connecting walk 165(1) are (as yet) assigned permutations, nor any arcs are assigned exchanges. In other words, the shortest connecting walk 165(1) is the shortest way to start at an assigned node, i.e. the dummy entry node 160(1) and travel to an assigned node, i.e., the dummy exit node 160(2) via unassigned arcs 145 and nodes 140(1) through 140(N). If the first and last nodes in the shortest connecting walk 165(1) are distinct, it is a path. If the first and last nodes are the same node, it is a cycle. By starting with only at the dummy nodes marked as assigned rather than any other node (as well as no arcs) a shortest connecting walk may be repeatedly determined. Then permutations may be assigned to the nodes and exchanges to the arcs, marking both as assigned. A new shortest connecting walk may be determined, repeating this until there are no more connecting walks, i.e., no assigned nodes, or arcs, for well-formed program graphs remain unmarked. For example, the shortest connecting walk 165(1) connecting the dummy exit node 160(2) and the dummy entry node 160(1) shown in FIG. 3 may be derived in some cases. The shortest connecting walk 165(1) may be traversed, marking the arcs 145(1), 145(2), 145(3) and 145(4) and nodes 140(1), 140(k), and 140(N) encountered along the path at block 187.

If the first node in the shortest connecting walk 165(1) is the dummy exit node 160(2), the path may be reversed according to one embodiment, starting with the dummy entry node 160(1) and ending with the dummy exit node 160(2). However, for each node from the starting node to the end "target" node, the exchange distance may be computed between the node and target node permutations. If the distance along the path is greater than the exchange distance, a permutation may be created whose exchange distance is greater. This permutation may be assigned to the next node on the path (i.e., wander away from the target node). If the target node is the dummy exit node, and thus has no permutation, a permutation may be created such that the exchange distance from the starting node is greater than the current node (i.e., wander away from the starting node).

When unable to increase the path distance, any two elements may be exchanged, decreasing the distance on the path because already traversed as far away as possible. If the distance along the path is less than or equal to the exchange distance, a permutation may be created for which exchange distance to the target node is less than the current node while assigning it to the next node, heading for the target node. In doing so, the arcs 145 between the nodes 160(1) and 160(2) may be annotated with the exchanges and the permutations may be assigned to these nodes.

To create a permutation from the source that is exactly one exchange closer to the target permutation, any two distinct elements in the same derangement subset may be exchanged in one embodiment, splitting the derangement into two subsets (singleton or derangement), regardless of which two elements are chosen. To increase the distance by one exchange from the target permutation, any two elements from any two distinct subsets may be exchanged, be they singleton or derangement subsets. This normally combines the two subsets into one derangement subset regardless of which elements in each subset are chosen. In this way, the distance between two permutations may be measured to make permutations move away from each other, and to bring them back together in a bounded number of exchange operations. Following Tables IA through IIIC illustrate the concepts of exchange distance between permutations according to one embodiment of the present invention.

TABLE IA

Permutation (p1)

| S | B | Z | Y | A | C | F | Q | W | T | X |
|---|---|---|---|---|---|---|---|---|---|---|

TABLE IB

Permutation (p2)

| S | C | Y | X | F | B | A | Q | Z | T | W |
|---|---|---|---|---|---|---|---|---|---|---|

In Tables IA and IB, two permutations (e.g., p1 shown in Table IA and p2 shown in Table IB) of a set may be compared to find the smallest possible (primitive) subsets of elements that are arrangements (each element in the same position in both permutations) or derangements (subsets of elements that are not in the same position in both permutations). The smallest arrangements may contain one element. The smallest (primitive) derangements are those that cannot be further divided into smaller derangements.

In the embodiment shown in Tables IA and IB, the smallest derangement has two elements; however, some other embodiments may have more than two elements. The exchange distance between the two permutations may be sum ((D[i]−1)), where Di is the cardinality (number of elements) in derangement i, varying i over all derangements. For example, in Tables IA and IB primitive subsets (not comprised of smaller subsets), singleton arrangements: {S}, {Q}, {T} (element is in the same place), and derangements: {A, F}, {B, C}, {W, X, Y, Z} (elements in each other's places). The exchange distance between the permutations p1 and p2 is the sum of the (cardinality of each primitive subset less one): (1−1)+(1−1)+(1−1)+(2−1)+(2−1)+(4−1)=5 exchanges.

TABLE IIA

Permutation (p1)

| S | B | Z | Y | A | C | F | Q | W | T | X |
|---|---|---|---|---|---|---|---|---|---|---|

TABLE IIB

| Permutation (p2) | | | | | | | | | |
|---|---|---|---|---|---|---|---|---|---|
| S | C | Y | X | F | B | A | Q | Z | T | W |

TABLE IIC

| Permutation (p1') | | | | | | | | | |
|---|---|---|---|---|---|---|---|---|---|
| S | B | Z | W | A | C | F | Q | Y | T | X |

As shown in Tables IIA through IIC, for two permutations p1 and p2 at exchange distance d, a new permutation p1' may be created at exchange distance d−1 from p2 by exchanging two distinct elements from the same derangement subset. Of course, when there are no derangement subsets, the permutation p1 is the same as the permutation p2, as these permutations cannot get any closer.

Consistent with one embodiment shown in Tables IIA through IIC, the permutation p1' (one exchange closer to the permutation p2 than the permutation p1) that is shown in Table IIC may be formed by exchanging any two distinct elements of a derangement subset of elements that are not in the same position in both the permutations p1 and p2. Specifically, elements W and Y may be exchanged from {W, X, Y, Z} in the permutation p1 to form the permutation p1'. While the derangements corresponding to the permutations p1' to p2 include subsets {Z, Y}, {W, X}, {A, F}, {B, C}, the distance between the permutation p1' and the permutation p2 is (2−1)+(2−1)+(2−1)+(2−1)=4, as one example.

TABLE IIIA

| Permutation (p1) | | | | | | | | | |
|---|---|---|---|---|---|---|---|---|---|
| S | B | Z | Y | A | C | F | Q | W | T | X |

TABLE IIIB

| Permutation (p2) | | | | | | | | | |
|---|---|---|---|---|---|---|---|---|---|
| S | C | Y | X | F | B | A | Q | Z | T | W |

TABLE IIIC

| Permutation (p1*) | | | | | | | | | |
|---|---|---|---|---|---|---|---|---|---|
| S | Q | Z | Y | A | C | F | B | W | T | X |

As shown in Tables IIIA through IIIC, for two permutations p1 and p2 at exchange distance d, a new permutation p1* may be created at exchange distance d+1 from the permutation p2 by exchanging two elements of the permutation p1 that are in distinct primitive subsets (either can be a singleton arrangement or derangement), except when the maximum distance is reached. This may happen when there is only one derangement subset, which consists of all the elements in the permutation.

According to one embodiment of the present invention shown in Tables IIIA through IIIC, the permutation p1* may be formed from the permutation p1 which is one exchange further from the permutation p2 by exchanging one element from each of two distinct subsets. In particular, element Q from {Q} and element B from {B, C} may be exchanged in the permutation p1 to form the permutation p1*. While the derangements corresponding to the permutations p1* to p2 include subsets {B, C, Q}, {A, F}, {W, X, Y, Z}, the distance between the permutation p1* and the permutation p2 is (3−1)+(2−1)+(4−1)=6, in one specific example.

For the control flow transformation, to shuffle the data, data exchange indications may be assigned to those arcs 145 for which the permutation distance in terms of number of nodes 140 is less than the remaining path distance in terms of intermediate nodes 140 over the shortest connecting walk 165(1). The permutations may be stored at the intermediate nodes on the shortest connecting walk 165(1) in the control flow graph 120 shown in FIG. 3.

In the illustrated example, permutations may be stored for the shortest connecting walk 165 between the dummy exit node 160(2) and the dummy entry node 160(1) at the intermediate node 140(k). Both the arcs, i.e., the arc between the dummy entry node 160(1) and the node 140(k) and the arc further to the dummy exit node 160(2) may be marked along with the intermediate node 140(k) within the shortest connecting walk 165(1) in this particular example consistent with certain embodiments of the present invention. A check at diamond 189 may ascertain whether or not all arcs 145 in the shortest connecting walk 165(1) have been marked. In case some of the arcs are remaining to be marked, the flow returns to block 185. Otherwise, at block 191, to determine variable offsets in each block 130 regular code may be generated using the node permutations stored at the intermediate nodes, e.g., the node 140(k) according to the example set forth above. In addition, data exchange code may be generated on each arc being marked for the shortest connecting walk 165, shuffling the data as the program 55 executes. In this way, a desired execution of the program source code 35a may be performed in a random order, adequately hiding the embedded secrets 75 in a portable manner across different platforms.

In some embodiments, a heuristic may relate control flow to a data permutation, using a conventional control flow graph to determine the distance between two points in the program 55. Ignoring the direction of the arcs 145, and assigning weights to the arcs (for example, as a function of the code in a block 130), a distance function between any two points as the shortest connecting walk 165 may be obtained between the points. To this end, the control flow graph 120 may be augmented with one dummy entry node 160(1) while connecting it to the entry node(s). Similarly, one dummy exit node 160(2) may be added, connecting all the exit nodes to this node.

For the source-level compiler 30, a function may return a shortest connecting walk from any element in a set of nodes 140 to a second element, using each arc 145 only once. The two elements need not be distinct since circuits may be allowed in some embodiments of the present invention. Initializing this set to the dummy entry node and dummy exit node, a shortest connecting walk may be determined through the function.

A random permutation of variable offsets in a large array may be assigned to the entry node. By moving along the path from the entry to exit, traversing away from the initial permutation, permutations may be assigned to the nodes 160(1) and 160(2) and exchanges to the arcs 145 on the control flow graph 120. When unable to move away (already at the maximum distance) instead move closer on the path. Accordingly, each node along the way may be added to the set to form a set of nodes with assigned permutations. The arcs 145 may be marked as assigned in the control flow graph 120, while the process repeats until all nodes 140 get assigned a permutation and all arcs 145 have been assigned exchanges, as an example. In this manner, after the first path, the final node has been assigned a permutation, in the target permutation with the exception of dummy exit node 160(2).

Based on the heuristic, however, by moving away on the path from the initial permutation when the path distance on the control flow graph 120 is two or more greater than the permutation distance to the target permutation, generating additional exchanges. Upon determining the shortest connecting walk 165(1), the permutations may be saved to reference variables by their block-dependent offset during code generation. These exchanges may cause additional code to be generated along the 145 arcs.

In order to more quickly find the shortest connecting, walk 165(1) as indicated above, for some embodiments an incremental shortest connecting walk algorithm may be deployed. For a given control flow graph, such as the control flow graph 120 shown in FIG. 3, using the incremental shortest connecting walk algorithm, the shortest connecting walk (e.g., 165(1) and 165(2)) may be repeatedly determined from a component (subset) to itself, traversing the arcs 145 and the nodes 140 not in the component.

More precisely, a shortest connecting walk may be determined, for example {N0, A1, N1, A2, N2, ..., An, Nn} such that a) N0 and Nn are in the component; b) N1 ... N(n−1) are not in the component; c) A1 ... An are not in the component; d) N0 may be Nn, but all other Ni (or equivalently all Ai) are distinct; e) each Ai is included without regard to its direction. While the arcs 145 in the control flow graph 120 are directed, the direction is ignored for purposes of this example of the shortest connecting walk because when adding exchange code in the reversed arcs, ideally may have their exchanges inserted in reverse order.

Consistent with one embodiment, pseudo-code is shown in the following Table IV for the incremental shortest connecting walk algorithm in which the arcs 145 of the control flow graph 120 may be augmented using suitable functions including nextOnPath arc. SPFrom node, SPTo node, and an integer key. However, if the are is at the beginning of a path, the list of arcs may be obtained using the nextOnPath. Each arc x is referred to as path x in the pseudo-code. In operation, 1) the function SPHeap is initialized first once with an initial list of nodes in a component C; 2) to find a the next shortest connecting walk processSPHeap is called next; 3) for each node in the path, the node is added to the component C and the function shortestPathUpdateNode is called; 4) steps 2-3 are repeated until step 2 returns nil indicating there are no more paths remaining in the control flow graph 120 to be traversed.

TABLE IV

```
void initializeSPHeap (heap H, component C)
{
    for all nodes N in C {
        mark N visited
        shortestConnectingWalkNewNode(N, nil, H, C)
    }
}
// incrementally obtain shortest connecting walk
arc processSPHeap(heap H, component C)
{
    while (H is not empty) {
        remove winning arc from H and call it P
        if P->SPTo has not been visited {
            if P->nextOnPath is nil { // p->SPFrom is in the component
                if (P->SPTo is in component c) {
                    return P // trivial one-arc path
                }
            }
            find an arc M over union of all predesessors and
```

TABLE IV-continued

```
successors of P->SPTo
                not in the component with minimum key, else
let M be nil
            if M is not nil {
                let REV be the reverse of the path M //
(exchange SPFrom and SPTo, and altering nextOnPath fields)
                append path REV to the end of path P
                return arc P
            }
        } else {
            mark P->SPTo as visited
            shortestConnectingWalkNewNode(P->SPTo, P, H, C)
        }
    }
    return nil
}
// update a previous reached node when a new path to it is found
void shortestConnectingWalkUpdateNode(node N, arc I, heap H, component C)
{
    arc M := nil
    integer L := undefined
    for arc A in union of predecessors and successors of n
    {
        if arc A is not I and arc A is not in component C
        {
            // NOTE: this is an incomplete path, but the lower bound on the length of any complete
            // path that includes it is 2 * sum of arc values in path so far
            if A->key > I->key + 2 * A->value
            {
                A->nextOnPath := I // found shorter path
            }
            if A->nextOnPath is I
            {
                A->key := I->key + 2 * A->value
                if arc A has already been visited
                {
                    shortestConnectingWalkUpdateNode(A->SPto, A, H)
                } else {
                    H->updateEntry(A)
                }
            } else { // we found a complete path--set key to its true length
                integer T = (incoming->key + a->key) / 2
                if M is nil or T < L
                {
                    M := A
                    L := T
                }
            }
        }
    }
    if M is not nil
    {
        if I->key >= M->key
        {
            I->key := M->key
            H->updateEntry(I )
        } else {
            M->key := L
            M->nextOnPath := I
            H->updateEntry(M);
        }
    }
}
void shortestConnectingWalkNewNode(node N, arc I, heap H, component C)
{
    arc M := nil
    integer L := undefined
    for arc A in union of predecessors and successors of N
    {
        if A is not I and A is not in C
        {
            if A has not been visited
            {
                mark A as visited
```

TABLE IV-continued

```
        A->key := I->key + 2 * A->value
        A->nextOnPath := I
    } else if A->key > I->key + 2 * A->value
    {
        A->nextOnPath := I
        A->key := I->key + 2 * A->value
        if node A->SPTo has not been visited
        {
            shortestConnectingWalkUpdateNode(A-
>SPTo, A, H)
        } else {
            H->updateEntry(A)
        }
    } else if I is not nil
    {
        integer T = (I->key + A->key) / 2
        if M is nil or T < L
        {
            if ArcAtEndOfPath(I) is not
ArcAtEndOfPath(A)
            {
                M = A
                L = T
            }
        }
    }
}
if M is not nil
{
    if I->key <= L
    {
        I->key := L
        H->updateEntry(I)
    } else {
        M->key := L
        M->nextOnPath := I
        H->updateEntry(M)
    }
}
}
```

Figure 5A:
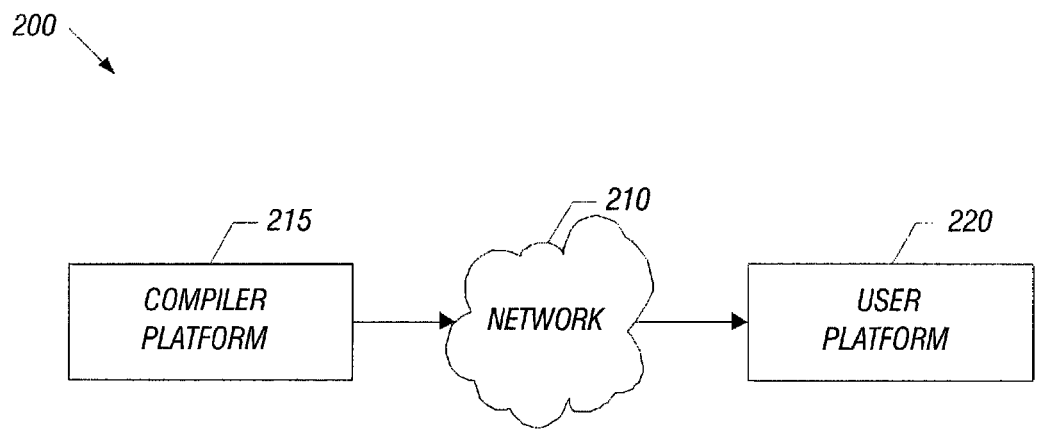
FIG. 5A is a schematic depiction of a communication link between a compiler platform and a user platform over a network that distributes software for which content protection is implemented securing secrets via the pre-compiler software shown in FIG. 1 consistent with one embodiment of the present invention.
Figure 5B:
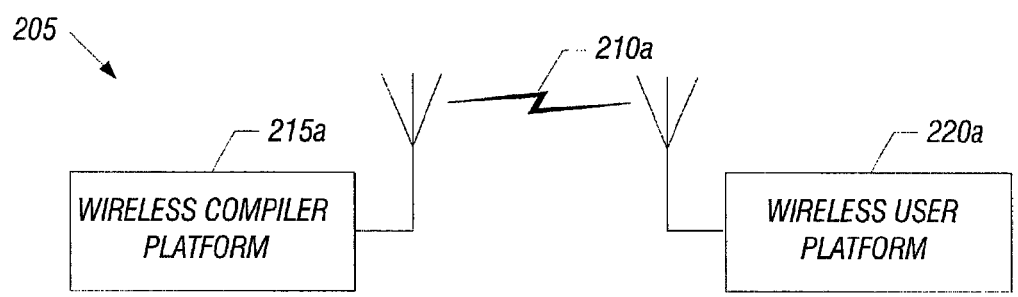
FIG. 5B is a schematic depiction of a wireless communication link according to another embodiment of the present invention.

Referring to FIGS. 5A and 5B, a communication link 200 and a wireless link 205 for securely distributing content from one platform to another platform are shown, respectively. In particular, a network 210 which may couple a compiler platform 215 to a user platform 220 via the communication link 200 may provide content protection at the user platform 220. Examples of the user platform 220 include a processor-based device, a computing device, a communications device, or a consumer device to which protected content may be delivered from a content provider. Likewise, in FIG. 5B, over a wireless communication link 210a, a wireless compiler platform 215a may provide content to a wireless user platform 215b. For example, the wireless user platform 215b may be a wireless communication device or a portable device, both capable of receiving protected content from a content provider. Other examples of the wireless user platform 215b include mobile devices, such as cellular phones which may comprise appropriate security hardware in order to protect content where appropriate. Instead of using security hardware, software applications may be deployed in the cell phones, replacing the security hardware with removable software in some cases.

Figure 6A:
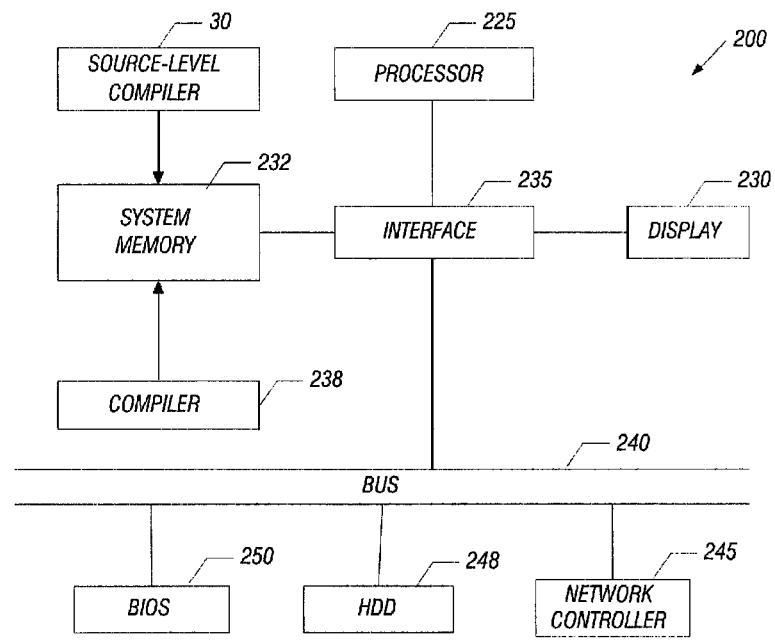
FIG. 6A shows a processor-based system based on the compiler platform shown in FIG. 5A incorporating the pre-compiler software shown in FIG. 1 in accordance with one embodiment of the present invention.

Some embodiments of the present invention may be implemented in software for execution by a processor-based system 220, as shown in FIG. 6A based on the compiler platform shown in FIG. 5A incorporating the source-level compiler 30 to implement content protection that probably secures the embedded secrets 75 within the program 55. In many embodiments of the present invention, the processor-based system 220 may include a processor 225 coupled to a display 230 and a system memory 232 through an interface 235. Illustrative interface 235 may be abridge circuit in an embodiment, or may include one or more buses in another embodiment. The source-level compiler 30 and a commercial compiler 238 may be loaded into the system memory 232 according to some operations consistent with certain embodiments of the present invention.

In the processor-based system 220, a primary bus 240 conforming to the peripheral component interface (PCI) standard, for example, may couple a network controller 245, a hard disk drive (HDD) 248 and a basic input/output system (BIOS) to the processor 225 through the interface 235. In this manner, the primary bus 240 may couple to the interface 235 while providing an interface to peripheral devices. For some embodiments of the present invention, the processor-based system 220 may be responsible for distributing the compiler-modified code 60. Other wireless systems may be implemented in other embodiments of the present invention.

Figure 6B:
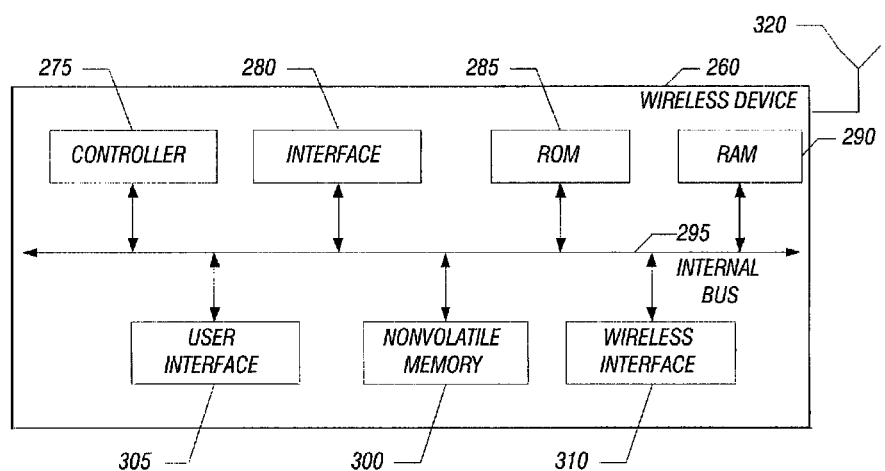
FIG. 6B is a wireless device based on the user platform shown in FIG. 5B according to one embodiment of the present invention.

A wireless device 260 shown in FIG. 6B schematically depicts a device consistent with the user platform 215h shown in FIG. 5B may include a semiconductor nonvolatile memory 300, a user interface 305, a wireless interface 310, and an antenna 320. Components for the wireless device 260, which may be a processor-based device may further include a controller 275, an interface 280, a read only memory (ROM) 285, and a random access memory (RAM) 290 coupled via an internal bus 295, according to one embodiment of the present invention. The interface 280 may enable communications via the wireless interface 310 and the antenna 320 to a platform, e.g., the compiler platforms 215 or 215a (shown respectively in FIGS. 5A and 5B) that may distribute content, e.g., the compiler-modified code 60. In different embodiments, however, non-wireless devices may be used. Examples of the wireless device 260 include mobile devices and/or cellular handsets that may be targeted for providing various subscriber services by commercial vendors or service providers. To manipulate such services or simply activate or reconfigure a device, content, e.g., the compiler-modified code 60 may be received over an air interface at the wireless device 260 in a platform-independent manner for some embodiments.

In some embodiments, the platform-independent compiler-modified code 60 advantageously may not require position-independent code, may not use self-modifying code (i.e., may work in the ROM 285), may be independent of an instruction set (cross-platform), and significantly improve performance while preventing attacks such as buffer-overflow attacks and other attacks encompassing calling non-exported internal functions from unauthorized outside code. The platform-independent compiler-modified code 60 may also be used in conjunction with different platform-specific tamper resistant software devised to work at the machine-code level. Incidentally, the source language 60 to develop the program 55 for the wireless device 260 may be an applicative language which may be easily analyzed and optimized for both performance and obscurity, as well as amenable to proofs of correctness while permitting reference count garbage collection for various applications, such as real-time video and audio rendering.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a non-transitory computer readable medium storing instructions that, when executed by a computer processor-based system, result in:

developing for a program including one or more data variables, blocks of code, jumps and a secret in a control flow graph indicative of at least one unique variable layout for said one or more data variables;

compiling the program based on said at least one unique variable layout to obscure said secret while shuffling data across the program during execution;

identifying said one or more blocks of code as nodes and said one or more jumps as arcs of the control flow graph;

adding exactly one dummy entry and one dummy exit node to the control flow graph to assign permutations to non-dummy nodes in the control graph; and assigning permutations to said dummy entry and dummy exit nodes and marking said nodes as assigned.

2. The article of claim 1, comprising a medium storing instructions that, if executed, enable a processor-based system to perform steps including:

finding on the control flow graph a shortest connecting walk connecting two marked nodes of said one or more dummy entry and exit nodes;

traversing the shortest connecting walk marking all arcs and nodes;

determining whether all arcs have been marked; and if not, finding another shortest connecting walk connecting two different marked nodes.

3. The article of claim 2, comprising a medium storing instructions that, if executed, enable a processor-based system to perform steps including responsive to all arcs being marked, generating code using node permutations to determine said different variable offsets in at least one block of said one or more blocks and generating additional code for at least one arc of said one or more arcs of the control flow graph.

\* \* \* \* \*